(12) United States Patent
Fan et al.

(10) Patent No.: US 8,611,608 B2
(45) Date of Patent: Dec. 17, 2013

(54) FRONT SEAT VEHICLE OCCUPANCY DETECTION VIA SEAT PATTERN RECOGNITION

(75) Inventors: Zhigang Fan, Webster, NY (US); Abu Saeed Islam, Rochester, NY (US); Peter Paul, Webster, NY (US); Beilei Xu, Penfield, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 240 days.

(21) Appl. No.: 13/215,401

(22) Filed: Aug. 23, 2011

(65) Prior Publication Data
US 2013/0051625 A1 Feb. 28, 2013

(51) Int. Cl.
*G06K 9/00* (2006.01)
(52) U.S. Cl.
USPC .......................................... 382/104; 382/100
(58) Field of Classification Search
USPC .................................................. 382/100, 104
See application file for complete search history.

(56) References Cited

U.S. PATENT DOCUMENTS

| | | | | |
|---|---|---|---|---|
| 5,801,763 A | * | 9/1998 | Suzuki | 348/77 |
| 6,553,296 B2 | * | 4/2003 | Breed et al. | 701/45 |
| 7,027,619 B2 | | 4/2006 | Pavlidis et al. | |
| 7,076,088 B2 | | 7/2006 | Pavlidis | |
| 7,477,758 B2 | | 1/2009 | Piirainen et al. | |
| 7,570,785 B2 | | 8/2009 | Breed | |
| 7,788,008 B2 | | 8/2010 | Breed | |
| 7,898,402 B2 | * | 3/2011 | Odate et al. | 340/438 |
| 7,914,187 B2 | * | 3/2011 | Higgins-Luthman et al. | 362/465 |
| 8,054,203 B2 | | 11/2011 | Breed et al. | |
| 2009/0295921 A1 | * | 12/2009 | Fujita | 348/148 |

OTHER PUBLICATIONS

Wang, et al., "Determining A Number Of Objects In An IR Image", U.S. Appl. No. 13/086,006, filed Apr. 13, 2011.
Mestha, et al., "Method For Classifying A Pixel Of A Hyperspectral Image in A Remote Sensing Application", U.S. Appl. No. 13/023,310, filed Feb. 8, 2011.
Wang, et al., "Determining A Total Number Of People In An IR Image Obtained Via An IR Imaging System", U.S. Appl. No. 12/967,310, filed Dec. 14, 2010.
K Somashekar, et al., "Face Detection By SMQT Features And Snow Classifier Using Color Information", International Journal of Engineering Science and Technology, Feb. 2011, pp. 1267-1272, vol. 3, No. 2, ISSN: 0975-5462.

(Continued)

*Primary Examiner* — Shefali Goradia
(74) *Attorney, Agent, or Firm* — Philip E. Blair; Fleit Gibbons Gutman Bongini & Bianco P.L.

(57) ABSTRACT

What is disclosed is a system and method for determining whether a front seat in a motor vehicle is occupied based on seat pattern recognition. The present invention takes advantage of the observation that an unoccupied seat of a motor vehicle exhibits features which are distinguishable from an occupied seat. An unoccupied motor vehicle seat typically features long contiguous horizontal line segments and curve segments, and substantially uniform areas encompassed by these segments which are not present in an occupied seat. The present method provides a long horizontal edge test which uses location information within a defined window of the image, edge linking, softness of the edge, number of lines, line/curve fitting, and other techniques to locate horizontal edges in the image which define a seat, and a uniformity step which determines whether the area bounded by the horizontal edges is relatively uniform indicating an unoccupied seat.

6 Claims, 9 Drawing Sheets

(56) References Cited

OTHER PUBLICATIONS

Dowdall, Jonathan, et al., "Face Detection in the Near-IR Spectrum", Journal of Image and Vision Computing, 2003, pp. 565-578, vol. 21, No. 7.

Nilsson, Mikael, et al., "Face Detection Using Local SMQT Features And Split Up SNoW Classifier", IEEE International Conference on Acoustics, Speech, and Signal Processing, 2007, ISI No. 000248908100148.

Perez-Jiminez, Alberto J., et al., "High Occupancy Vehicle Detection", LNCS 5342, 2008, pp. 782-789. Springer-Verlag Berlin Heidelberg 2008.

S.B. Goktuk, A. Rafii, "An Occupant Classification System Eigen Shapes or Knowledge-Based Features", IEEE Computer Vision and Pattern Recognition Workshops, San Diego, p. 57, Jun. 2005 (Abstract).

I. Pavlidis, et al., "A Vehicle Occupant Counting System Based on Near-Infrared Phenomenology and Fuzzy Neural Classification", IEEE Transactions on Intelligent Transportation Systems, vol. I. No. 2, Jun. 2000, pp. 72-81 (Abstract).

H. Kong, et al., Disparity Based Image Segmentation for Occupant Classification, IEEE Computer Vision and Pattern Recognition Workshop, Washington DC, 2004 (Abstract).

\* cited by examiner

FRONT SEAT VEHICLE OCCUPANCY DETECTION VIA SEAT PATTERN RECOGNITION

TECHNICAL FIELD

The present invention is directed to systems and methods which process an image of a motor vehicle to determine whether a front seat in a front passenger compartment of that vehicle is occupied.

BACKGROUND

High Occupancy Vehicle (HOV) lane enforcement is one of the important topics in the transportation management business. In HOV lane enforcement, penalties are imposed on owners of vehicles travelling with less than a predetermined number of occupants (e.g., less than 2). Recent efforts have been directed to the areas of sensing and image capture for HOV lane enforcement. Further development in this art is needed as entirely automatic solutions for determining the number of occupants in a vehicle can be quite challenging, particularly for the passengers in the back seats. Nevertheless, semi-automatic methods that combine machine detection with human verification/inspection are valuable, as these methods reduce the workload and increase the detection rate comparing to entirely human detection. In the semi-automatic method, an alert signal, together with images/video of the vehicle, is sent to the law-enforcement officer, if an HOV lane violation is detected by the machine. The officer may verify the captured image and decide if further actions are necessary. Such methods increase the productivity of the traffic enforcement authorities.

Accordingly, what is needed in this art are increasingly sophisticated systems and methods for processing an image of a motor vehicle to determine whether a front seat in a front passenger compartment of that vehicle is occupied.

INCORPORATED REFERENCES

The following U.S. Patents, U.S. Patent Applications, and Publications are incorporated herein in their entirety by reference.

"Determining A Number Of Objects In An IR Image", U.S. patent application Ser. No. 13/086,006, by Wang et al.

"Determining A Total Number Of People In An IR Image Obtained Via An IR Imaging System", U.S. patent application Ser. No. 12/967,775, by Wang et al.

"Method For Classifying A Pixel Of A Hyperspectral Image In A Remote Sensing Application", U.S. patent application Ser. No. 13/023,310, by Mestha et al.

"*Face Detection Using Local SMQT Features And Split Up SNoW Classifier*", by Mikael Nilsson, lorgen Nordberg, and Ingvar Claesson, Blekinge Inst. of Tech., School of Eng., Ronneby, Sweden, Int'l Conf. Acoustics Speech and Signal Proc. (ICASSP), 589-592, ISSN; 1520-6149, Honolulu, Hi. (April 2007).

"*Face Detection By SMQT Features And SNoW Classifier Using Color Information*", K. Somashekar, C. Puttamadappa, and D. N. Chandrappa, Int'l Journal of Eng. Science and Technology (IJEST), Vol. 3, No. 2, pp. 1266-1272, (February 2011).

BRIEF SUMMARY

What is disclosed is a novel system and method for processing an image of a motor vehicle to determine whether a front seat in a front passenger compartment of that vehicle is occupied. The present invention takes advantage of the observation that an unoccupied seat of a motor vehicle exhibits features which are distinguishable from an occupied seat. An unoccupied motor vehicle seat typically features long contiguous horizontal line segments and curve segments, and substantially uniform areas encompassed by these segments which are not present in an occupied seat. The present method provides an edge detection test to locate horizontal and vertical line segments in the image and curved segments, and a uniformity step which determines whether the area bounded by these edge segments are relatively uniform or relatively non-uniform.

In one example embodiment, the present system and method for determining whether a seat in an image of a motor vehicle is occupied involves first, capturing an image of a motor vehicle which is intended to be analyzed for seat occupancy. The image is captured using, for example, a still or video imaging system operating in either the visible or infrared wavelength bands. The captured image is analyzed to determine features of a seat. In a manner more fully disclosed herein, the captured image is analyzed to extract seat features and then a determination is made whether the seat is occupied. In one embodiment, this involves performing edge detection on the image to determine line and curve segments and then analyzing the line segments to determine a boundary region of a seat and an associated headrest, if any. Once the seat features have been identified, a determination can then be made whether the seat is occupied.

Also disclosed is a method for determining whether a violation has occurred by the vehicle traveling in a HOV lane which can be used in conjunction with the teachings hereof. In this embodiment, the captured image is preprocessed for contrast, noise reduction, and motion deblurring. The background is identified and the vehicle is located in the scene. A front windshield of the vehicle is isolated via feature extraction (e.g. parallel lines between the upper/lower windshield and side mirrors). Once the windshield has been isolated, face detection is performed using methods such as, for example, local SMQT features and split-up SNoW classifier as disclosed in the above-incorporated references. If there isn't a single face detected in the windshield area then the process stops and the image is sent to a human operator for manual processing. If multiple faces have been detected, no further verification is required as the vehicle contains multiple passengers. If only a single face is detected then a further determination is made whether the detected face is on the passenger side or the driver's side relative to the windshield region. If the detected face is on the passenger side of the windshield area, it is assumed to be the face of a passenger and, in one embodiment, the image is sent to an operator for processing. In another embodiment, it is assumed that there are two passengers in the vehicle and no HOV violation is recorded. If the detected face is to the driver's side of the front windshield area, it is assumed to be the driver of the vehicle and a second determination is made whether the front seat on the passenger side is occupied. Using the teachings hereof, seat features are attempted to be extracted in an identified region of the front passenger compartment where a passenger would be seated. A determination is made whether a passenger is seated in the front of the vehicle based upon the results of the seat feature extraction. If no seat features were extracted, the front passenger region of the vehicle is determined to be occupied as the seat features are blocked by the seated passenger. If seat features can be extracted then it is determined that the front passenger seat is unoccupied and a violation has occurred. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a novel system and method for vehicle occupancy detection based on seat feature extraction.

It should be appreciated that, in many countries, automobiles are designed such that the driver sits on the righthand side of the front passenger compartment and the passenger sits on the lefthand side of the front passenger compartment taken from the viewpoint of standing in the front of the vehicle and looking at the front windshield. In other countries, automobiles are designed so that the driver is on the lefthand side and the passenger is on the righthand side of the front passenger compartment from the same viewpoint. As such, any discussion herein referring to left and right side of the passenger compartment is intended to cover both designs and should not be viewed as limiting in any way.

Non-Limiting Definitions

A "motor vehicle" can be either a passenger automobile such as, for example, the family car, or a commercial vehicle or truck.

An "image of a motor vehicle" means a still image or a sequence of video images of a motor vehicle. Such an image is composed of a plurality of pixels.

A "feature of a seat" refers to any physical characteristic of a seat of an automobile. Such features are the shape of the seat, i.e., size, width, height, headrest, and arm rests of the seat, the characteristics of any of the materials which comprise the seat, along with a color and texture of the seat. One example motor vehicle seat is shown and discussed with respect to seat 100 of FIG. 1.

Figure 1:
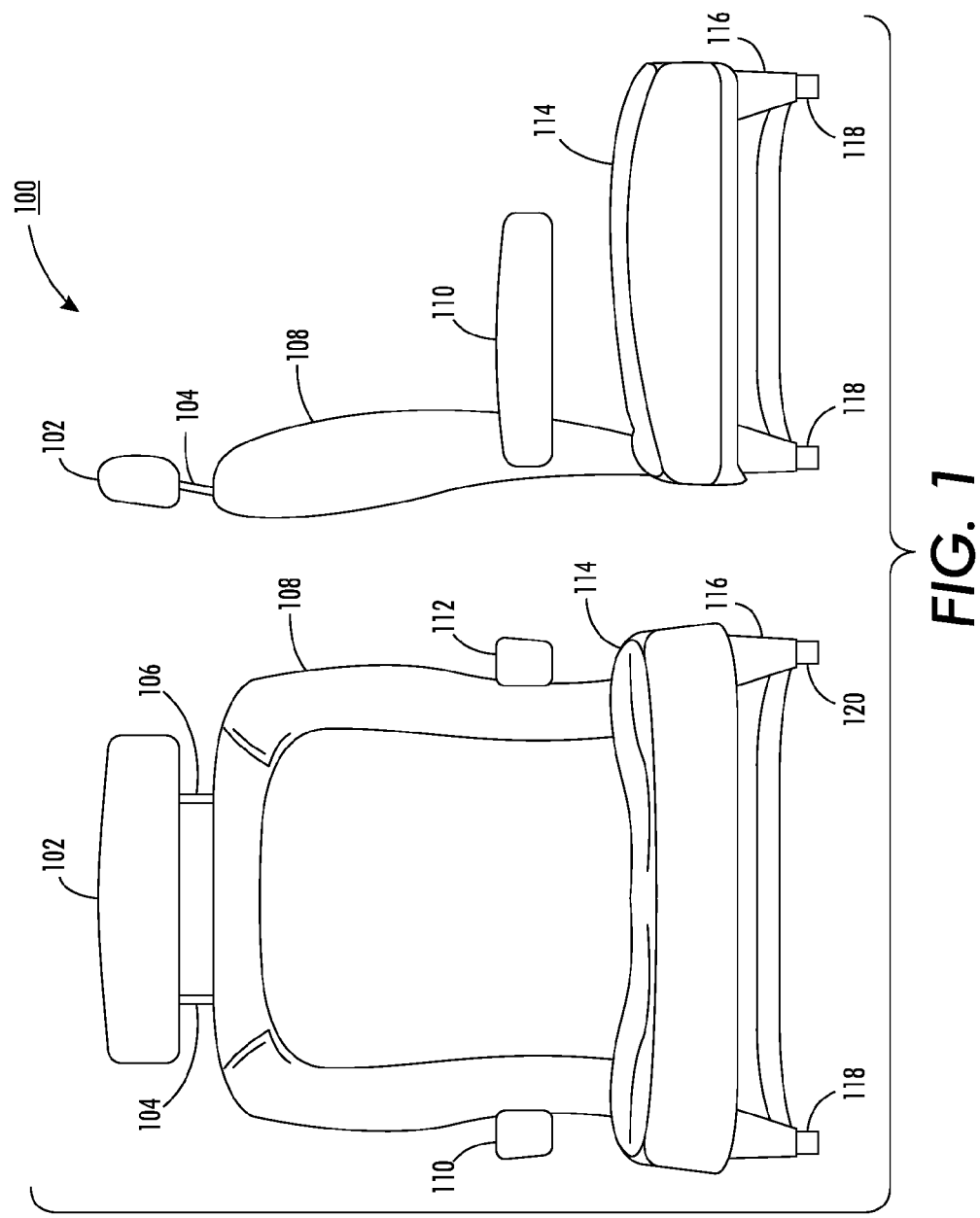
FIG. 1 shows a front and side view of an example seat of a motor vehicle.
Figure 9:
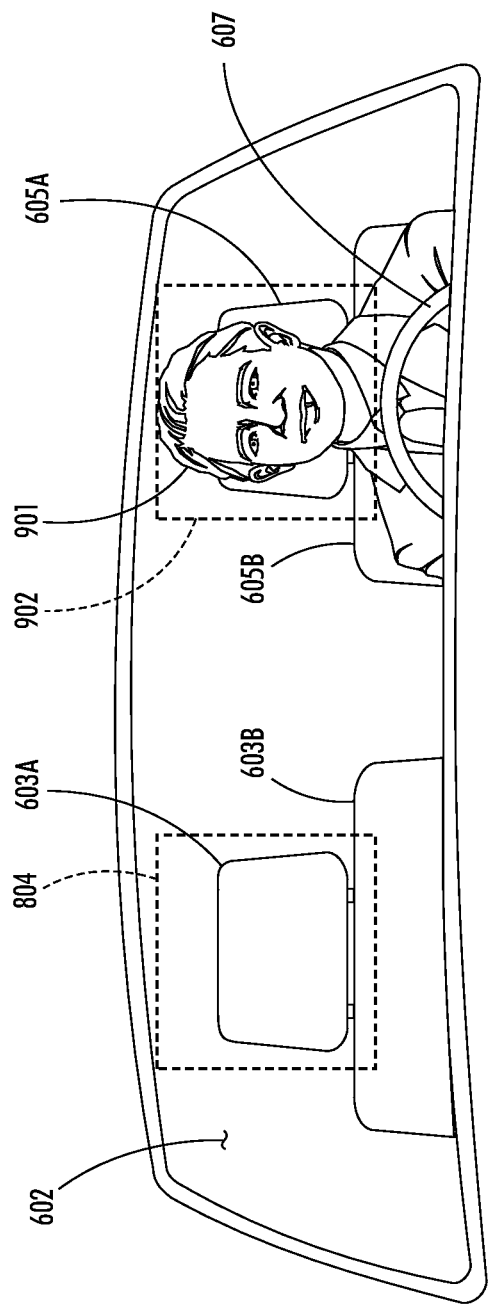
FIG. 9 shows a windshield area of a motor vehicle traveling in the HOV lane having a driver occupying the driver side of the front passenger compartment and no passenger occupying the passenger side of the front compartment.

An "occupied seat" is a seat within a motor vehicle which has a human being sitting in that seat. An unoccupied seat does not have a human occupant. One example unoccupied seat is shown in FIG. 1. The embodiment of FIG. 9 shows the front passenger seat unoccupied and the front driver's seat occupied.

The "windshield area" is the area which has been clipped from an image of a motor vehicle showing the front passenger compartment of the vehicle. An example windshield area is shown at region 602 of FIGS. 6A and 6B.

Basic Edge Detection

Edge detection is a method for identifying areas or regions of an image at which the image changes or where discontinuities can be detected. There are many methods for edge detection. Most edge detection methods can be grouped into search-based methods and zero-crossing based methods. Search-based methods detect edges by first computing a measure of edge strength, usually a first-order derivative expression in terms of a gradient, and then searching for local directional maxima of the gradient magnitude using a computed estimate of the local orientation of the edge, usually the gradient direction. Zero-crossing based methods search for zero crossings in a second-order derivative expression computed from the image in order to find edges, usually the zero-crossings of the Laplacian or the zero-crossings of a non-linear differential expression. As a pre-processing step to edge detection, a smoothing stage, typically Gaussian smoothing, is often applied. The edge detection methods that have been published mainly differ in the types of smoothing filters that are applied and the way the measures of edge strength are computed. As many edge detection methods rely on the computation of image gradients, they also differ in the types of filters used for computing gradient estimates in the x- and y-directions. For instance, a bilateral low-pass filter has the property of preserving edges in an image while smoothing random noise. The smoothing effect of the bilateral filter decays not only as a function of the distance from the input pixel, but also as a function of difference between the color (or intensity) values at the reference and neighboring pixels. Strong edges which exhibit large color or intensity differences will not be smoothed while small differences introduced by noise or texture will be smoothed. Essentially, the bilateral filter operates not only on a spatial distance from the input pixel but on a distance in color or intensity space from the color or intensity at the input pixel.

Motor Vehicle Front Passenger Seat

Reference is now being made to FIG. 1 which illustrates a front and a side view of an example seat of a motor vehicle which is unoccupied.

In FIG. 1, seat 100 has a headrest 102 for supporting the head. In various seat configurations, headrest 102 is vertically extendable by left and right slideably retractable support braces 104 and 106, respectively, for raising and lowering the headrest to a desired height. The slideably retractable braces which support the headrest are internally attached to back rest 108 which supports the passenger sitting in the seat. Seat 100 is shown comprising a left and right arm rest 110 and 112, respectively, for supporting the arms. Seat cushion portion 114 carries the weight of the seat's occupant. Seat cushion 114 is fixed to support brace 116 which, in many vehicles, enables the seat's occupant to adjust the seat both horizontally (forward and backward) and vertically (raise and lower). Various aspects of the teachings hereof are directed towards determining whether such a seat in a passenger compartment of a motor vehicle contains a human occupant.

Example HOV Camera System

Figure 2:
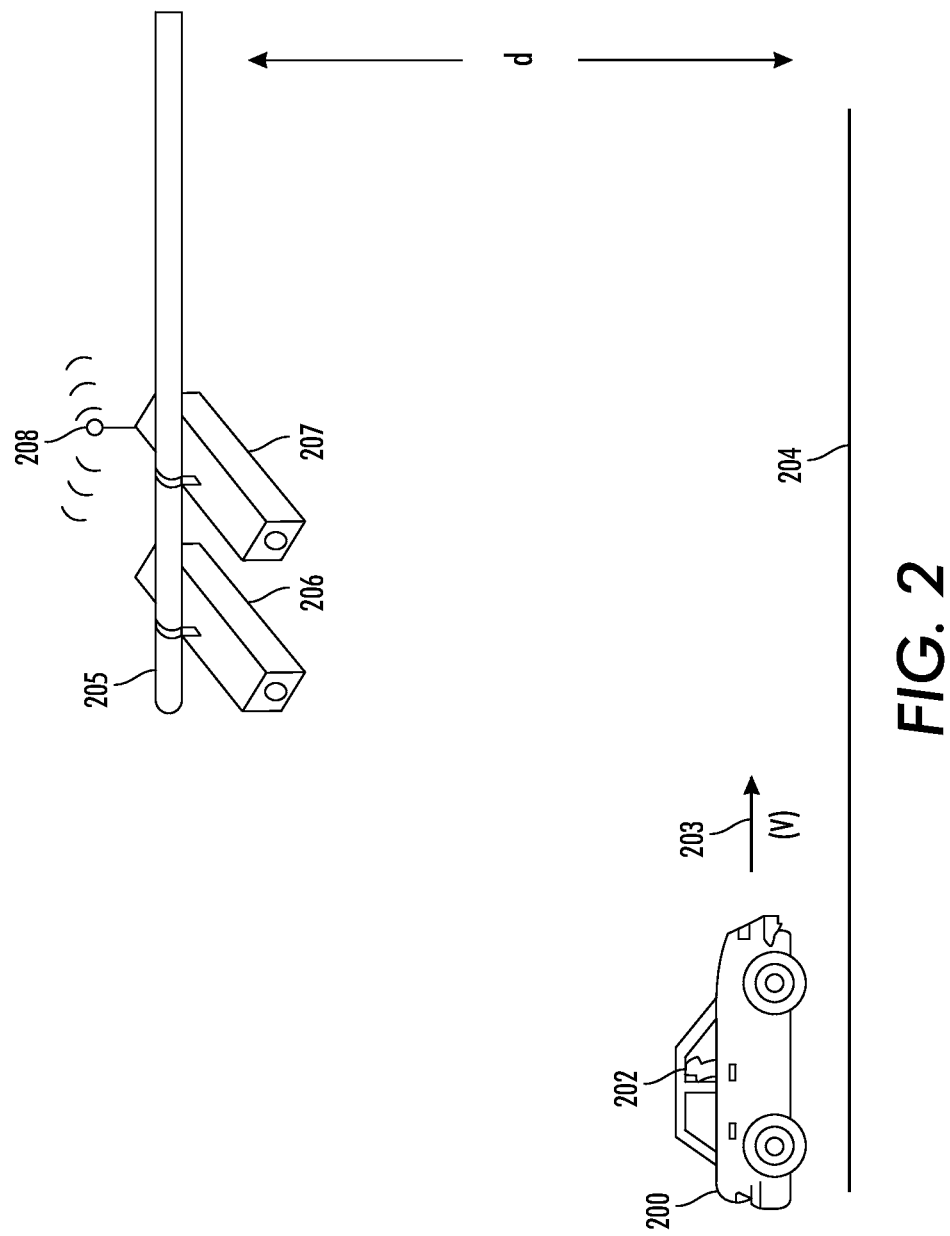
FIG. 2 shows an example vehicle occupancy detection system which incorporates the a video imaging system and which transmits the video image to a remote device for processing in accordance with the teachings hereof.

Reference is now being made to FIG. 2 which shows an example target vehicle occupancy detection system incorporating a video imaging system which transmits the video image to a remote device for processing in accordance with various embodiments of the teachings hereof. Vehicle 200 contains a human occupant 202 traveling at velocity v in a direction indicated by vector 203 along HOV lane 204. Positioned within a desired distance d above lane 204 is support arm 205 comprising a tubular construction similar to that used for traffic lights. Fixed to this support arm is image capture system 207 having a transmission element 208 for communicating captured images to a remote device for processing as will be next described with respect to the flow diagram of FIG. 3. Device 207 may comprise a camera equipped with a telephoto lens, a filter, and a polarizing lens to reduce glare. It should be appreciated that the occupant of the vehicle is sitting in a seat such as that of FIG. 1. Also show attached to support arm 205 is illuminator 206 for illuminating motor vehicle 200 using a light source as required by camera 207.

Flow Diagram of Seat Feature Extraction

Figure 3:
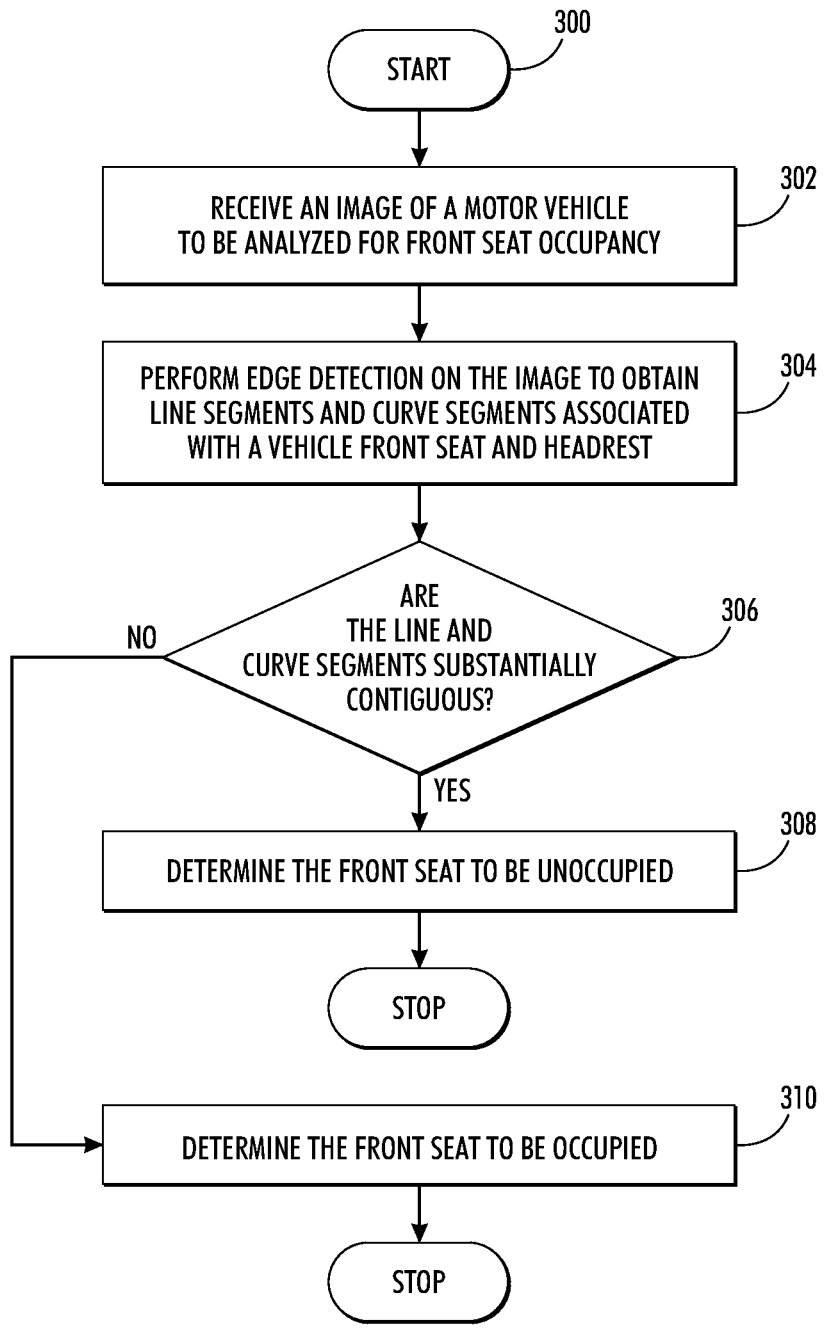
FIG. 3 is a flow diagram of one example embodiment of the present method for determining whether a seat in an image of a motor vehicle is occupied.

Reference is now being made to the flow diagram of FIG. 3 which illustrates one example embodiment of the present method for determining whether a seat in an image of a motor vehicle is occupied using seat feature extraction. Flow processing begins at step 300 and immediately proceeds to step 302.

At step 302, an image of a motor vehicle intended to be analyzed for front seat occupancy is received. The image can be received from a still camera or a video imaging system operating in either the visible or non-visible spectrum. In the embodiment wherein the present method of seat occupancy detection is used for HOV lane enforcement, the image of the moving motor vehicle is preferably obtained from a video imaging system positioned nearby or over the lane wherein traffic enforcement is desired. The captured images are transmitted over a wired or wireless network to a computer workstation for processing. The image may be pre-processed to determine a location of a windshield area and that portion of the image clipped for further processing. One or more regions of the image may be selected for processing by a user using, for example, a graphical display device of a computer workstation wherein the captured images are displayed. Regions of the image may be enlarged or otherwise enhanced by, for instance, adjusting brightness, contrast, hue, and the like.

At step 304, edge detection is performed on the captured image to determine line segments and curve segments associated with a vehicle front seat and headrest. Edge detection is performed using techniques such as horizontal edge detection followed by edge linking, or a Hough Transform. One embodiment utilizes a complexity measure processor which incorporates a spatially sensitive entropy operator to calculate a local measure of complexity (entropy) for a given pixel in the image. This complexity measure is then used to reference a LUT to obtain a threshold value which, in turn, is used by the spatial bilateral filter to process pixels of the image. Other local operators may be employed to determine a pixel's respective measure of complexity. A discussion as to the features, benefits, and differences of various operators is beyond the scope hereof. Suffice it to say that each operator brings different characteristics to bear on the calculation of a pixel's complexity measure.

Figure 4A:
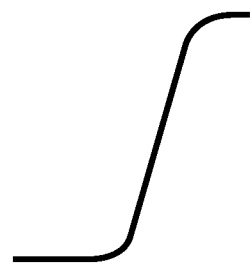
FIGS. 4A-C show edge profiles of typical seats, with 4B and 4C showing an edge with a sharp transition and a ridge edge, respectively.
Figure 4B:
Figure 4C:
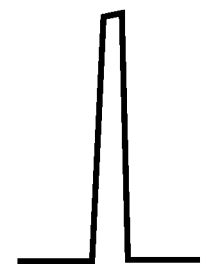

At step 306, a determination is made whether the line and curved segments are substantially contiguous. If so then at step 308, it is determined that the seat is unoccupied. Otherwise, at step 310, it is determined that the seat is unoccupied. When a seat is occupied, long edges are partially (or fully) obscured by the seat's occupant. As a result, edges may be broken into shorter pieces or missing altogether. Occasionally, line segments comprising a top edge of a seat remain intact when a shorter person occupies that seat. Edges associated with seats and headrests are typically "soft" with a relatively smooth transition. A typical edge profile is shown in FIG. 4A. FIGS. 4B and 4C represent an edge with a sharp transition and a ridge edge, respectively. These two types of edges are more often seen in cases where boundaries between adjoining fabrics of different colors and sewing seams. The edge profile is helpful in distinguishing seat edges from other edges. In another embodiment, pixels of the image associated with the seat and headrest areas are analyzed for color or intensity and a determination of whether the seat is occupied is based upon a uniformity of color or intensity in bounded areas. If the color or intensity of the area bounded by the line and curve segments associated with the seat and headrest is substantially uniform, then the seat is determined to be unoccupied.

In one embodiment of a HOV enforcement system, an authority is alerted by a signal when a front passenger seat is not occupied and the motor vehicle is traveling in a HOV lane during a time when travel in these lanes is restricted to two or more persons.

Example Image Processing System

Figure 5:
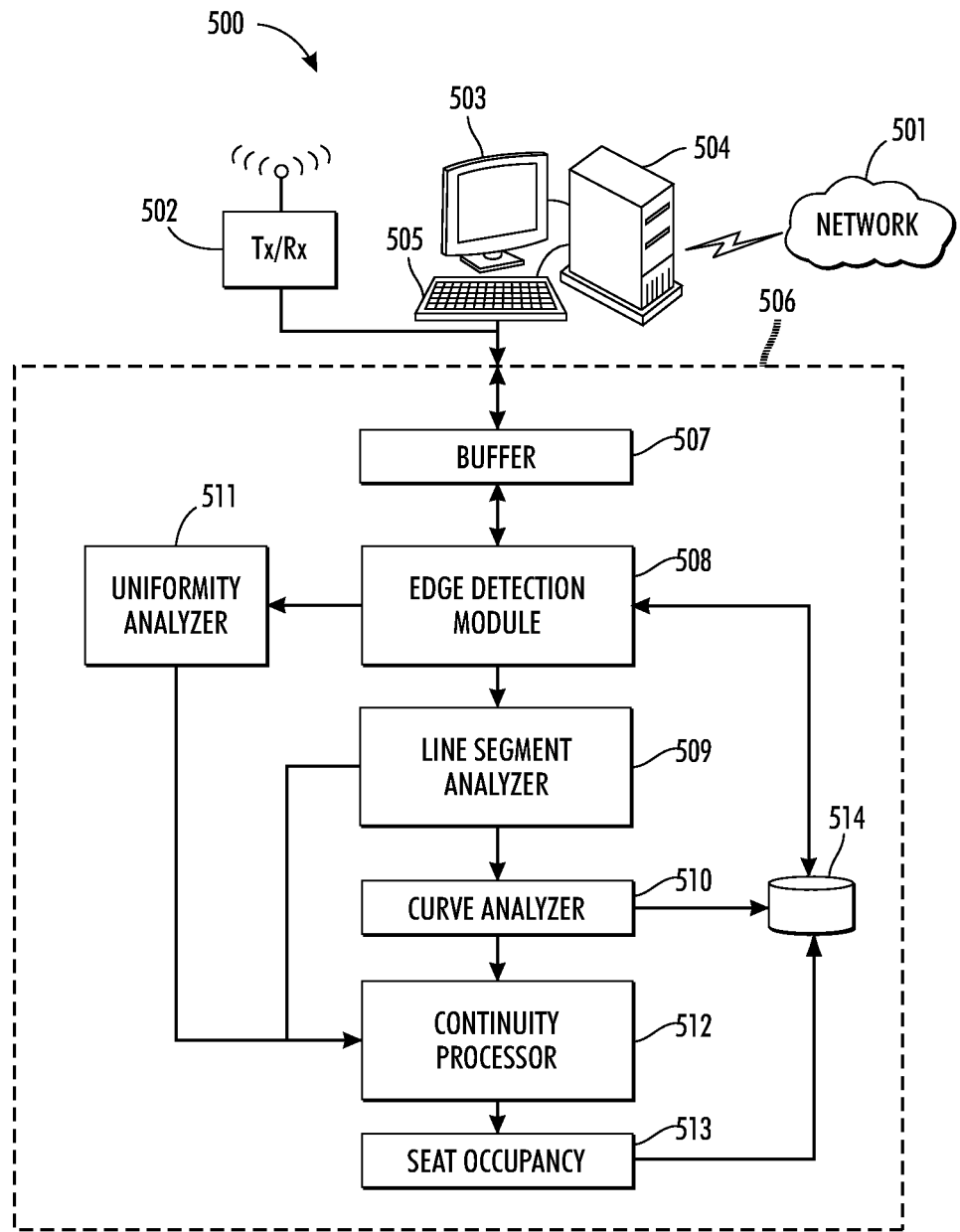
FIG. 5 which illustrates a block diagram of one example processing system capable of implementing various aspects of the present method shown and described with respect to the flow diagram of FIG. 3.

Reference is now being made to FIG. 5 which illustrates a block diagram of one example system capable of implementing various aspects of the present method shown and described with respect to the flow diagram of FIG. 3.

A workstation 504 is placed in communication with image receiver 502 for receiving pixel values from, for instance, antenna 208 of FIG. 2, and for effectuating bi-directional communication between computer 504 and detection device 208. Computer 504 further comprises display monitor 503 and user interface 505 for enabling a display of information for a user and for effectuating a user input or selection such as, for example, the user identifying a windshield area of the image or for visually inspecting an image in the instance where occupancy has failed, as discussed with respect to the flow diagram of FIGS. 7 and 8. A user may use the graphical user interface, e.g., keyboard and monitor, to identify or select pixels and/or areas of the image for processing or provide other user input required for the implementation hereof. Pixels and/or regions of identified or otherwise detected in the received image may be retrieved from a remote device over network 501. Various portions of the captured image of the motor vehicle may be stored to a memory or storage device in communication with workstation 504 or may be communicated to a remote device over network 501 via a communications interface (not shown) for remote storage or further processing. Computer 504 and receiver 502 are in communication with Image Processing Unit 506.

Image Processing Unit 506 is shown comprising a buffer 507 for queuing information relating to the received image such as, for instance, regions of interest within the image, and the like, which have been selected or otherwise identified for processing. Such a buffer may be configured to further store data, edge detection methods, line segments, mathematical formulas and representations needed to facilitate processing of the image in accordance with the teachings hereof. Edge Detection Module 508 receives from data needed to perform the calculations required and performs edge detection on the received image. Module 508 provides the detected edges to Line Segment Analyzer 509 which determines line segments. Curve Analyzer 510 determines curve segments. Uniformity Analyzer 511 is used for those embodiments where a color, reflectance, and/or texture of the seat are intended to be processed for uniformity. Continuity Processor 512 determines whether the line and curve segments are substantially contiguous. Seat Occupancy Module 513 receives results from Continuity Processor 512 and determines whether a seat is occupied. Any of the modules hereof are in communication with monitor 503 to present thereon information for a user selection. Various information such as variables, and the like, are stored and/or retrieved from storage device 514. Any of the modules and/or processing units of FIG. 5 are in communication with storage device 514 via pathways (not shown) and may store/retrieve data, parameter values, functions, pages, records, data, and machine readable/executable program instructions required to perform their various intended functions. Each of these modules is also in communication with workstation 504 via pathways (not shown) and may further be in communication with one or more remote devices over network 501. It should be appreciated that some or all of the functionality for any of the modules may be performed, in whole or in part, by components internal to the workstation.

Example Front Passenger Compartment

Figure 6A:
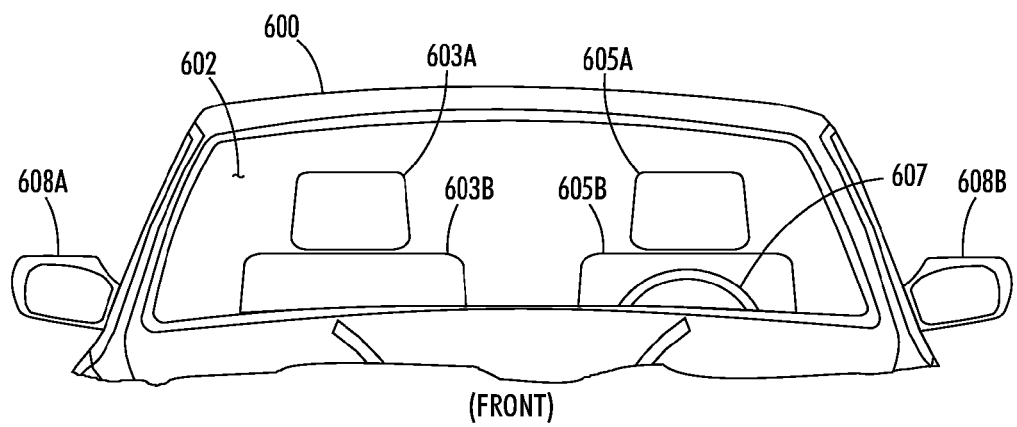
FIGS. 6A-B illustrate a front passenger compartment of a motor vehicle from the standpoint of looking through the front windshield.
Figure 6B:
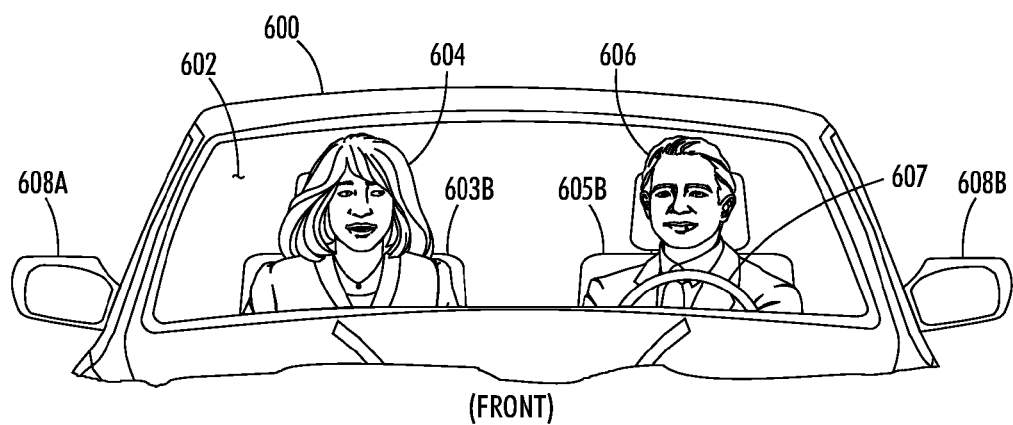

Reference is next being made to FIGS. 6A and 6B which illustrate a front passenger compartment of an example motor vehicle taken from the standpoint of the front of the vehicle looking through the front windshield 602. In FIG. 6A, the front passenger compartment of vehicle 600 is empty and thus features are readily extracted using the teachings hereof to identify headrest 603A and front passenger seat 603B, as well as headrest 605A of driver seat 605B shown positioned directly behind steering wheel 607. In FIG. 6B, the front passenger seat 603B is shown occupied by passenger 604 and the front driver's seat 605B is occupied by driver 606. The windshield area of the motor vehicle can be isolated and extracted from the image using, for instance, it's location relative to sideview mirrors 608A-B and the non-glass region surrounding the windshield itself.

Flow Diagram of Second Embodiment

Figure 7:
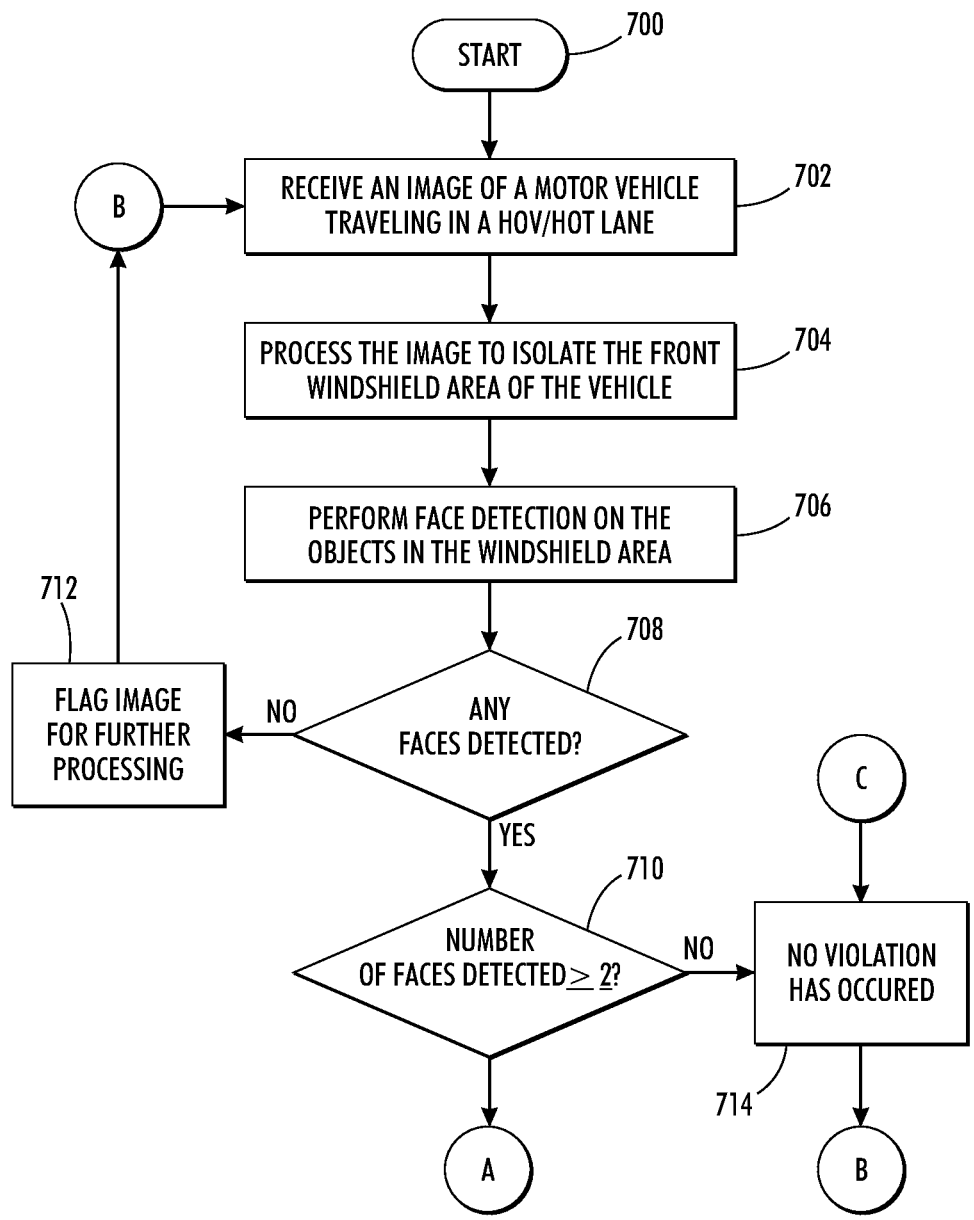
FIG. 7 is a flow diagram of one example embodiment of a method for determining whether a violation has occurred by a vehicle traveling in a HOV lane.
Figure 8:
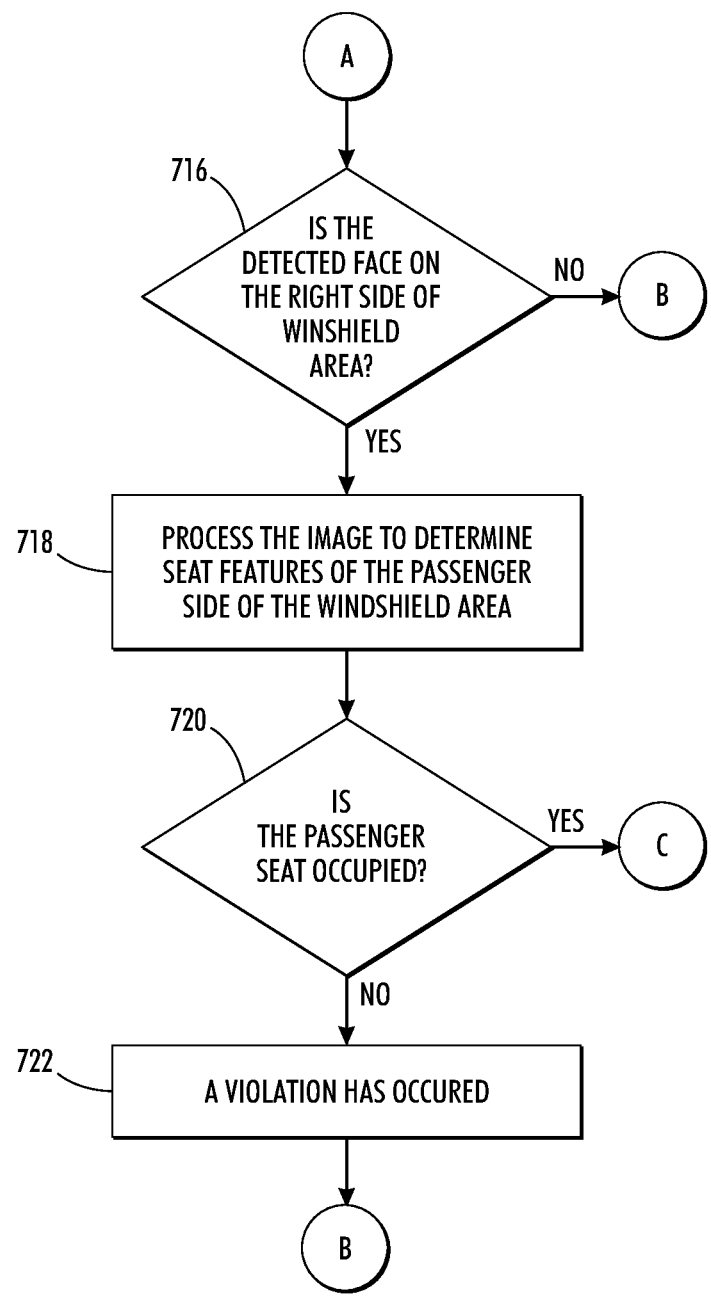
FIG. 8 is a continuation of the flow diagram of FIG. 7 with flow processing continuing with respect to node A.

Reference is now being made to the flow diagrams of FIGS. 7-8 which collectively illustrate one example embodiment of a method for determining whether a violation has occurred by a vehicle traveling in a HOV lane. This embodiment is used in conjunction with various aspects of the seat feature extraction teachings hereof. Flow starts at 700 and immediately proceeds to step 702 wherein an image of a motor vehicle traveling in a HOV lane is received. The image is captured using, for example, the camera system of FIG. 2. The captured image may be preprocessed for contrast, noise reduction, and motion deblurring. In various embodiments, the background is identified and the vehicle is located in the scene.

At step 704, a front windshield area of the vehicle is isolated via feature extraction (e.g. parallel lines between the upper/lower windshield and side mirrors). An example front windshield area is shown in FIG. 9. Once the windshield has been isolated in the image, the windshield is clipped from the image and, at step 706, face detection is performed such that a determination can be made whether either side of the front passenger compartment contains a passenger. Face detection can be performed using, for example, local SMQT features and split-up SNoW classifier as disclosed in the above-incorporated references.

At step 708, a determination is made whether any faces are detected in the isolated windshield area. If not then processing continues with respect to node A wherein, at step 712, the image is flagged for further processing. Further processing may take the form of utilizing the seat feature extraction methods disclosed herein to facilitate a determination whether the seat is occupied. In which case, processing would continue from 708 to step 718 instead of step 712. Further processing in step 712 may take the form of a human operator visually inspecting the image to determine whether a HOV violation has occurred. After the image has been flagged for further processing, processing continues with respect to node B wherein, at step 702, a next image of a next motor vehicle traveling in the HOV lane is received for processing and the method repeats for the next received image.

If faces have been detected in the windshield area at step 708 then a determination is made at step 710 whether the total number of faces detected is greater than or equal to 2. Two faces having been detected is shown by way of example at 604 and 606 of FIG. 6B. In this instance, processing continues with respect to step 714 wherein a determination is made that no violation has occurred because more than 1 passenger was determined to be in the front passenger compartment of the vehicle traveling in the HOV lane. Thereafter, processing continues with respect to node B wherein, at step 702, another image of a motor vehicle traveling in the HOV lane is received for processing.

If, at step 710, only a single face was detected then processing continues with respect to node A of FIG. 8 wherein, at step 716 a determination is made whether the detected face is on the driver's side of the windshield area. If the detected face is to the driver's side of the isolated windshield area, it is assumed to be the driver of the vehicle sitting behind steering wheel 607. Such an embodiment is shown in FIG. 9 which illustrates the driver's face 901 having been detected in area 902 of a driver's side of windshield region 602. If, on the other hand, the detected face is on the passenger side of the windshield region then flow continues with respect to node B wherein, at step 702, another image of a motor vehicle traveling in the HOV lane is received for processing. Since the face detection algorithm failed to detect a second face in the isolated windshield region, the windshield area is further processed, at step 718, using the seat feature extraction methods hereof. The seat feature extraction methods are used to identify the features of passenger seat 603B and headrest 603A of FIG. 9.

At step 720, a determination is made whether the passenger seat of the front passenger compartment of the motor vehicle is occupied based upon the extracted seat features. As is shown in FIG. 9, because the driver's head 901 occupies area 902 various features of the driver's headrest 605A and seat 605B cannot be fully detected thus leading to a determination that the seat is occupied. If the passenger seat is occupied then processing continues with respect to node C wherein, at step 714, it is determined that no HOV violation occurred because the front passenger compartment contained two occupants. If, at step 720, it is determined that the front passenger seat is not occupied then, at step 722, it is determined that a violation has occurred. When a violation has occurred, local law enforcement may be notified and a visual inspection of the vehicle performed. Thereafter, flow processing continues with respect to node B wherein a next image is received for processing. In another embodiment, further processing stops.

It should be appreciated that various aspects of the embodiment of the flow diagrams of FIGS. 7-8 are intended to be used in those HOV/HOT detection systems where a violation occurs when the front passenger compartment of the motor vehicle does not contain at least two passengers. Methods for detecting passengers in the rear passenger compartment or detecting infants in a car seat positioned in a backseat of the vehicle are beyond the scope of this invention.

It should be understood that the flow diagrams depicted herein are illustrative. One or more of the operations illustrated in any of the flow diagrams may be performed in a differing order. Other operations may be added, modified, enhanced, condensed, integrated, or consolidated. Variations thereof are intended to fall within the scope of the appended claims. All or portions of the flow diagrams may be implemented partially or fully in hardware in conjunction with machine executable instructions in communication with various components of such a system.

Various Embodiments

Various modules of the embodiments hereof may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other image processing system embodying executable program instructions capable of performing the methodology described in the flow diagrams.

Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention.

The teachings of any printed publications including patents and patent applications, are each separately hereby incorporated by reference in their entirety.

What is claimed is:

1. A method for determining whether a front passenger seat is occupied in an image of a motor vehicle traveling in a High Occupancy Vehicle (HOV) lane, the method comprising:
   receiving an image of a motor vehicle which is intended to be analyzed for seat occupancy;
   clipping said image to a windshield area;
   identifying features of a front passenger seat and associated headrest in a front passenger compartment of said motor vehicle where a passenger would be seated, comprising:
      performing edge detection on said windshield area of said clipped image to locate vertical, horizontal, and curved lines comprising edge segments of said seat and associated headrest;
      determining whether said lines are substantially contiguous; and
      determining whether an area bounded by said edge segments is substantially uniform or non-uniform; and
   in response to said edge segments being substantially contiguous and said bounded area being substantially uniform, determining from said seat features whether said front passenger seat is occupied.

2. The method of claim 1, wherein said edge detection comprises one of: a horizontal edge detection followed by edge linking, and a Hough Transform.

3. The method of claim 1, further comprising alerting an authority in the instance wherein a front passenger seat of said motor vehicle is not occupied and said motor vehicle is traveling in a High Occupancy Vehicle (HOV) lane.

4. A system for determining whether a front passenger seat is occupied in an image of a motor vehicle traveling in a High Occupancy Vehicle (HOV) lane, the system comprising:
   a memory and a storage medium; and
   a processor in communication with and said storage medium and said memory, said processor executing machine readable instructions for performing the method of:
      receiving an image of a motor vehicle which is intended to be analyzed for seat occupancy;
      clipping said image to a windshield area;
      identifying features of a front passenger seat and associated headrest in a front passenger compartment of said motor vehicle where a passenger would be seated, comprising:
         performing edge detection on said windshield area of said clipped image to locate vertical, horizontal, and curved lines comprising edge segments of said seat and associated headrest;
         determining whether said lines are substantially contiguous; and
         determining whether an area bounded by said edge segments is substantially uniform or non-uniform; and
      in response to said edge segments being substantially contiguous and said bounded area being substantially uniform, determining from said seat features whether said front passenger seat is occupied.

5. The system of claim 4, wherein said edge detection comprises one of: a horizontal edge detection followed by edge linking, and a Hough Transform.

6. The system of claim 4, further comprising alerting an authority in the instance wherein a front passenger seat of said motor vehicle is not occupied and said motor vehicle is traveling in a High Occupancy Vehicle (HOV) lane.

* * * * *